United States Patent [19]

Kowalski

[11] Patent Number: 4,827,480
[45] Date of Patent: May 2, 1989

[54] METHOD AND APPARATUS FOR GENERATING ULTRA-SHORT PULSES WITH A FREQUENCY SHIFTER IN A CAVITY

[75] Inventor: Frank V. Kowalski, Golden, Colo.

[73] Assignee: Colorado School of Mines, Golden, Colo.

[21] Appl. No.: 18,016

[22] Filed: Feb. 24, 1987

[51] Int. Cl.[4] .............................................. H01S 3/10
[52] U.S. Cl. ...................................... 372/28; 372/26; 372/93; 372/94; 307/425
[58] Field of Search ....................... 372/25, 19, 26, 28, 372/23, 92, 93, 94, 108, 101; 307/425

[56] References Cited

U.S. PATENT DOCUMENTS

| | | | |
|---|---|---|---|
| 3,656,068 | 4/1972 | Runge | 372/26 |
| 3,703,687 | 11/1972 | Maydan | 372/26 |
| 3,747,004 | 7/1973 | Sasnett | 372/26 |
| 3,834,790 | 9/1974 | Macken | 372/22 |
| 4,217,036 | 8/1980 | Chang | 372/26 |
| 4,380,073 | 4/1983 | Wayne | 372/25 |
| 4,498,179 | 2/1985 | Wayne et al. | 372/108 |
| 4,586,184 | 4/1986 | Hess | 372/94 |

Primary Examiner—William L. Sikes
Assistant Examiner—Xuan Thi Vo
Attorney, Agent, or Firm—Edwin L. Spangler, Jr.

[57] ABSTRACT

This invention relates to an improved method for producing pulsed trains of light within a cavity which comprises repeatedly incrementally increasing the frequency of a constant wave of light circulating within the cavity and combining the frequency-shifted beams to produce at least one pulsed train output thereof. This can be done in either a passive or active cavity.

8 Claims, 2 Drawing Sheets

METHOD AND APPARATUS FOR GENERATING ULTRA-SHORT PULSES WITH A FREQUENCY SHIFTER IN A CAVITY

BACKGROUND OF THE INVENTION

Generation of short laser pulses is important when studying various phenomena, transient and otherwise, and especially in the field of communications. Other applications are found in the field of non-linear optics; spectroscopy of liquids, gases and solids; relaxation measurements in biology; and, perhaps, in such devices as passive-ring gyroscopes.

In the past when one wished to produce a train of pulses, the accepted procedure was to fix the phases of the oscillating modes in a laser by modification of the feedback condition. One method of modifying the feedback is by modulating the gain, loss or phase of the laser cavity. Another method feeds back frequency-shifted waves into the oscillator. Current technology requires a pulsed laser to pump a dye laser. This leads to low output powers from the dye laser and generally inefficient pulse generation.

1. Field of the Invention

The present invention relates to the generation of short laser pulses within a cavity by employing a frequency shifter to shift the frequency of continuous waves passing therethrough by an incremental amount such that the sum of the frequency-shifted waves circulating or otherwise reflected within the cavity comprises a series of discrete pulses.

2. Description of the Related Art

Representative of the related art is the U.S. patent to Tang et al. U.S. Pat. No. 4,485,473 together with several of the prior art patents and literature references therein which relate to the generation of pulses in a ring cavity; however, all of these prior art references together with others known to applicant of a similar nature fall within the well known class of pulse generators which accomplish the objective through the use of one or the other of the techniques set forth previously, i.e. either by modulating the gain, loss or phase of the laser cavity or, alternatively, feeding back frequency-shifted waves into the oscillator. Applicant is unaware of any pulse-generation method, apparatus or techniques which employs a continuous wave circulating within a passive cavity, the frequency of which is shifted each pass by means of a frequency-shifting device such that the sum total of the frequency-shifted waves is such that a circulating pulse is produced.

SUMMARY OF THE INVENTION

It is, therefore, the principal object of the present invention to provide a novel and improved method and apparatus for the generation of ultra-short pulses of laser light, the foregong being accomplished by the simple, yet unobvious, expedient of repeatedly circulating or otherwise reflecting within a cavity a continuous wave through a piece of equipment of the well known type adapted to bring about a frequency-shift each pass through the cavity therein such that the sum total of these frequency-shifted waves cooperate with one another when added together to produce a train of discrete pulses.

A second objective is the provision of a method and apparatus of the type aforementioned which avoids the low output problems associated with the use of a relatively low-efficiently pulsed source to pump a dye laser or the like.

Another objective of the invention herein disclosed and claimed is to produce a train of ultra-short laser light pulses from a passive or active cavity.

Still another objective is the production of a pulse train, the pulses of which are modulated in intensity.

Still another object is to provide a pulsed output of laser light in which no destructive degradation of the latter results from the interference of the frequency-shifted continuous wave input signal used to produce same through appropriate adjustment of the cavity length or frequency of frequency shifter.

An additional objective is that of providing a considerably simpler, yet superior, method and apparatus for generating a train of ultra-short laser light pulses.

Further objects of the invention herein disclosed and claimed are to provide a laser pulse generator which is easy to assemble, relatively inexpensive, highly efficient, versatile and safe to use.

Other objects will be in part apparent and in part pointed out specifically hereinafter in connection with the description of the drawings that follows.

DESCRIPTION OF THE PREFERRED EMBODIMENTS

Figure 1:
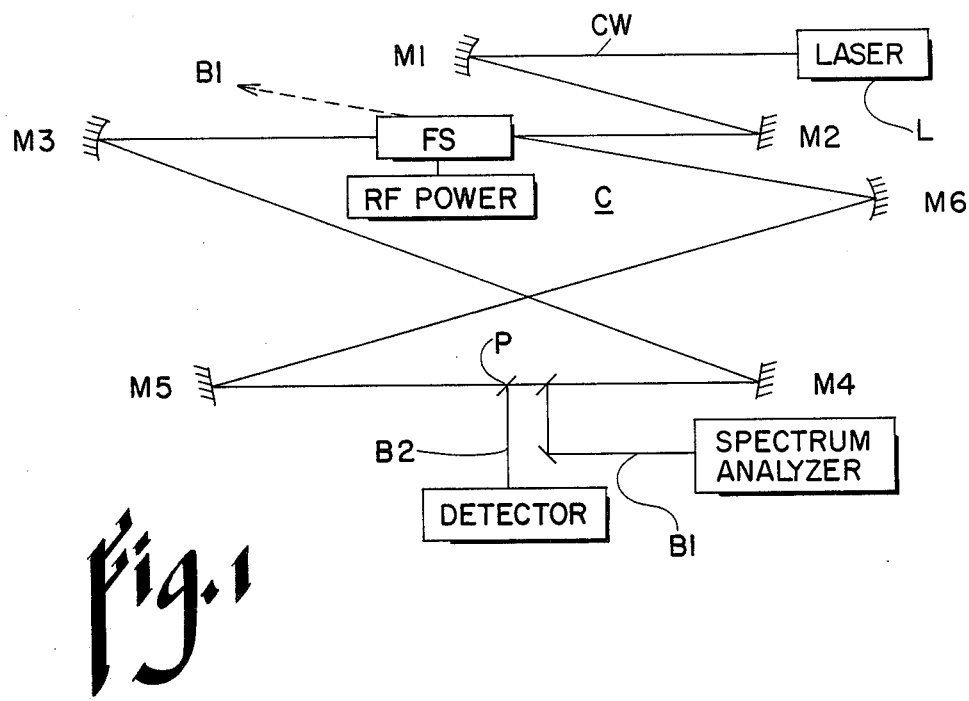
FIG. 1 is a schematic showing a six mirror system wherein a laser gain medium outputting a constant wave signal is circulated through a passive cavity containing an acousto-optic modulator that is operative to increase incrementally the frequency of the circulating signal during each pass such that the sum total of the signals thus increased outputs a pulse train.

Referring next to the drawing for a detailed description of the present invention and, initially, to FIG. 1 for this purpose, a continuous wave (cw) beam of laser light emanating from a suitable laser gain medium L is coupled into a passive cavity C off of mirrors M1 and M2 through the zeroth order diffraction peak of the acousto-optic modulator FS. Other frequency shifting devices could, of course, be used in place of the acousto-optic modulator. There are several commercially-available modulators that are satisfactory for use in the system shown in the schematic, one particular unit employed successfully by applicant being one made by the Hoya Corporation (Model 100) designed to bring about an 80 MHz shift in the frequency of the beam cw passing therethrough.

The frequency-shifted beam leaving the modulator FS is reflected around the cavity from four mirrors, M2, M3, M4 and M5 before reentering the frequency shifter. Mirrors M2 and M3 are aligned as shown such that the first order diffraction peak retraces the path of the initial beam, however, as previously-noted, it undergoes a frequency shift increasing a matter of 80 MHz during each circuit or pass.

By way of example of a system using an 80 MHz modulator, the curvature of mirrors M3 and M6 is 1.20 meters, whereas, mirrors M4 and M5 are flat. The distances between mirrors is: M3 to M4, 0.88 meters; M4 to M5, 1.34 meters; M5 to M6, 1.02 meters; and, M6 to M3, 0.51 meters. The "round trip" length of the cavity C is 3.75 meters.

The laser cavity L was conventional consisting of a Brewster window discharge tube (Melles Griot Model 05-LHB-290), a high reflecting flat, and a 60 cm radius-of-curvature, 0.9% output coupler separated by 0.468 meters. The output coupler was mounted upon a linear translation stage (Newport Corp. Model 460-X). The beam path from the laser to M1 was 0.8 m. The spot size at the FS was given for the respective passes as: 0.5 mm, 0.5 mm, 0.4 mm, 0.2 mm, 0.1 mm, 0.4 mm, 0.6 mm, 0.7 mm, and 0.8 mm.

The light circulating in the cavity C was extracted by a Pyrex plate P aligned near Brewster's angle. One output beam B2 went to an avalanche photodiode detector (Newport Corp. Model 877) which had a 200 picosecond risetime while the other output beam B1 went to a spectrum analyzer having a 2 GHz free spectral range (Spectra-Physics Model 470-03). The risetime of the oscilloscope (not shown) was 700 picoseconds (Tektronix Model 7904A which had a 7A19 amplifier).

Figure 4:
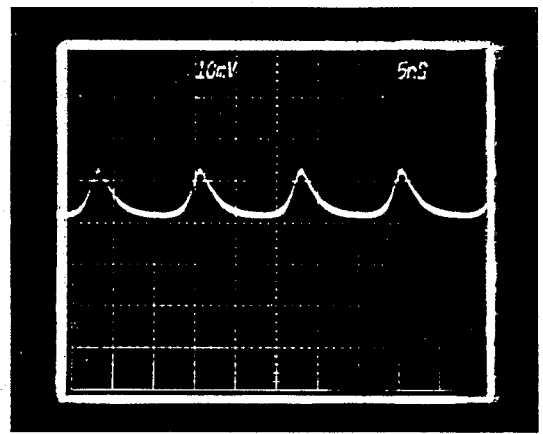
FIG. 4 is a trace showing the output of the avalanche photodiode resulting from a single frequency input to the system shown in FIG. 1.
Figure 5:
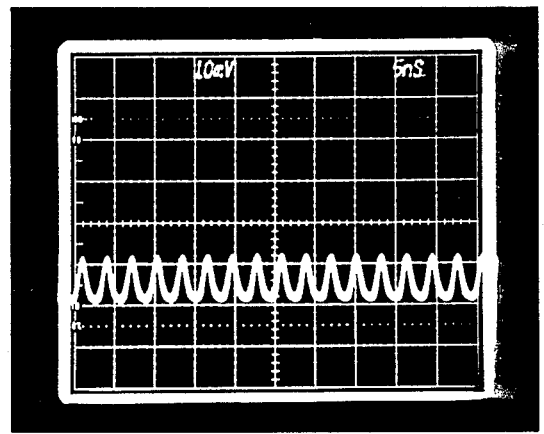
FIG. 5 is a trace showing the output of the avalanche photodiode resulting from a multiple frequency input to the FIG. 1 system with the acousto-optic modulator turned off.
Figure 6:
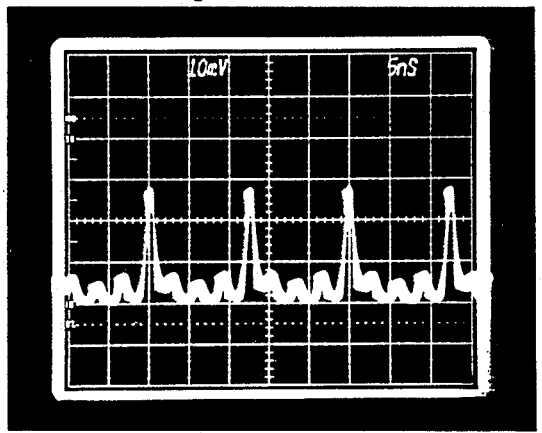
FIG. 6 is a trace showing the output of the avalanche photodiode under the same conditions as FIG. 5 but with the acousto-optic modulator turned on and operating at an efficiency of approximately 40%.
Figure 7:
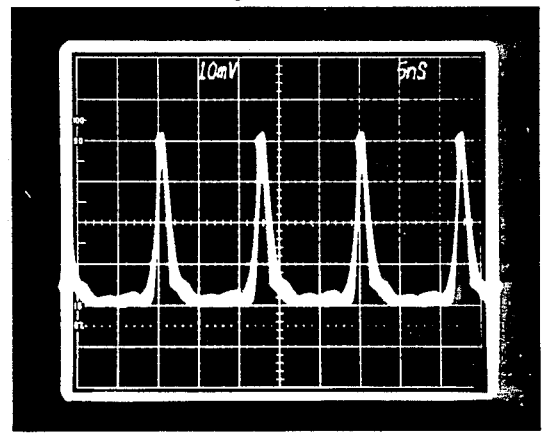
FIG. 7 is a trace showing the output of the avalanche photodiode under the same conditions as FIG. 6 but with the acousto-optic modulator operating at an efficiency of approximately 90%; and, FIG. 8 is a trace showing the output of the photodiode for a two frequency input to the system.

The output of the avalanche photodiode with the He-Ne laser oscillating in a single frequency and the FS driven to its maximum efficiency is shown in FIG. 4. The response of the cavity with the He-Ne laser oscillating in three frequencies separated by 320 MHz can be seen in FIGS. 5, 6 and 7. Specifically, FIG. 5 shows the output of the avalanche photodiode with the FS turned off. In FIGS. 6 and 7, the modulator is progressively driven to its maximum efficiency. All other parameters are the same as in FIG. 5.

Figure 8:
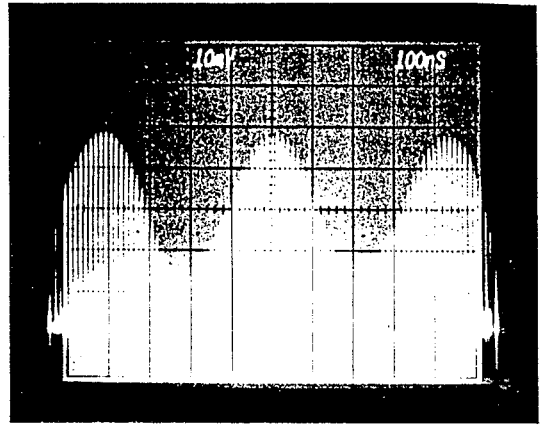

FIG. 8 shows the output of the avalanche photodiode for the He-Ne laser operating in two modes which are separated by about 322.5 MHz. The pulse envelope varied in duration as a function of the cavity length of the laser which determines the frequency separation of the modes. This shows that pulses which are modulated in intensity can be produced.

From an analytical standpoint, consider the superposition of the fields circulating in the "cavity" when a single frequency, $\omega_o$ of amplitude $E_o$ is incident on the AOM. Assume also that the amplitude transmission coefficient into the zeroth order diffracted beam is $\tau$ while the amplitude "reflection" coefficient into the first order diffracted beam is r. Further assume that there is no other loss in the cavity. Let the cavity length be L (assumed to be independent of the frequency of the light), the origin of the coordinate system be at the AOM, and the frequency shift at the AOM be $+\Omega$.

It is now possible to calculate the total electric field, $E_T$, a distance aL from the AOM, where $a<1$. This corresponds, for instance, to the electric field at the output coupler. For the arrangement in FIG. 1, it can be seen that:

$$E_T = E_o \tau e^{i\delta_0} + E_o \tau r e^{i\delta_1} + E_o \tau r^2 e^{i\delta_2} + E_o \tau r^3 e^{i\delta_3} + \ldots$$

where, $$\delta_0 = \frac{\omega_o aL}{c} - \omega_o t,$$

$$\delta_1 = \frac{\omega_o L}{c} + \frac{(\omega_o + \Omega)}{c} aL - (\omega_o + \Omega)t,$$

$$\delta_2 \frac{\omega_o L}{c} + (\omega_o + \Omega)\frac{L}{c} + (\omega_o + 2\Omega)\frac{aL}{c} - (\omega_o + 2\Omega)t, \text{ etc.}$$

Factoring $E_o \tau e^{i\delta_0}$ from all the terms and noting that the cavity length was set so that it satisfied $$\frac{\Omega L}{c} = 2\pi,$$

then:

$$E_T = E_o \tau e^{i\delta_0}[1 + re^{i\Delta} + r^2 e^{i2\Delta} + r^3 e^{i3\Delta} + \ldots] \quad (1)$$

where $$\Delta = \omega_o \frac{L}{c} + \Omega \frac{aL}{c} - \Omega t.$$

Solving for the intensity:

$$I = I_o \frac{\tau^2}{[1-r]^2} \frac{1}{1 + \frac{4r \sin^2(\Delta/2)}{(1-r)^2}} \quad (2)$$

This is standard form for the intensity in a Fabrey-Perot interferometer; however, the phase $\Delta$ is now time dependent. The intensity as a function of $\Delta$ is the Airy function. The higher the reflectivity r, the sharper the peaks which is indicated in FIGS. 4, 5 and 6. To calculate the time between pulses, fix the parameters L, a, $\omega_o$ and $\Omega$ in equation (2), and let t vary. The time interval, $\Delta t$, between pulses is then, $$\Delta t = \frac{2\pi}{\Omega} = 12.5 \text{ nanosecs.}$$

FIG. 4 verifies this calculation.

For two waves of frequency, $\omega_o - \alpha$ and $\omega_o + \alpha$, incident on the AOM we need to sum two series of the form given in equation (1) to find the total electric field. If we assume that $\alpha = n\Omega +$ where n is an integer, $$\frac{L}{c} << 2\pi$$

and let $\phi$ be the relative phase between the incident waves, then we get, $$I \simeq 2I_o \frac{\tau^2}{[1-r]^2} \frac{4}{1 + \frac{4r\sin^2(\Delta/2)}{(1-r)^2}} \cos^2\left[n\Omega + \beta)(t - a\frac{L}{c} + \phi\right] \quad (3)$$

where $$\Delta = \omega_o \frac{L}{c} + \Omega a \frac{L}{c} - \Omega t.$$

The intensity is then a product of the Airy function in time with a trigonometric function. Apart from $\beta t$ both functions oscillate at a multiple of $\Omega t$. The modulation envelope is determined by $\beta$. FIG. 8 shows this result experimentally for $\beta/2\pi \simeq 2.5$ MHz. At the peak of this envelope the pulse power has increased by a factor of 4 over that for a single wave incident on the AOM.

Returning briefly to FIG. 2, a simplified schematic is shown wherein a laser gain medium L emits a constant wave output cw which is reflected back into the acousto-optic modulator FS by a pair of concave mirrors M1 and M3 axially aligned therewith. As the beams circulate in opposite directions increasing their frequency incrementally each pass, a pair of pulsed outputs B1 and B2 are produced. By merely placing a unidirectional device UD in one of the paths as shown in phantom lines, one of the two outputs can be simply eliminated.

Figure 2:
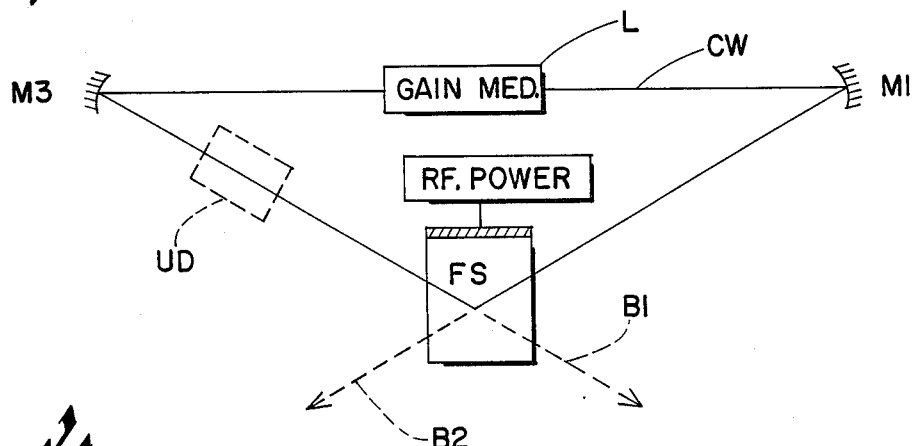
FIG. 2 shows in schematic form a laser gain medium directing a continuous wave signal simultaneously in opposite directions against a pair of concave mirrors aligned therewith both of which are positioned to reflect the beam upon the acousto-optic modulator used to intercept and change the frequency of the circulating signal during each pass such that the summation of the counter-circulating beams with the frequency thereof incrementally thus increased will produce a pair of pulsed outputs.
Figure 3:
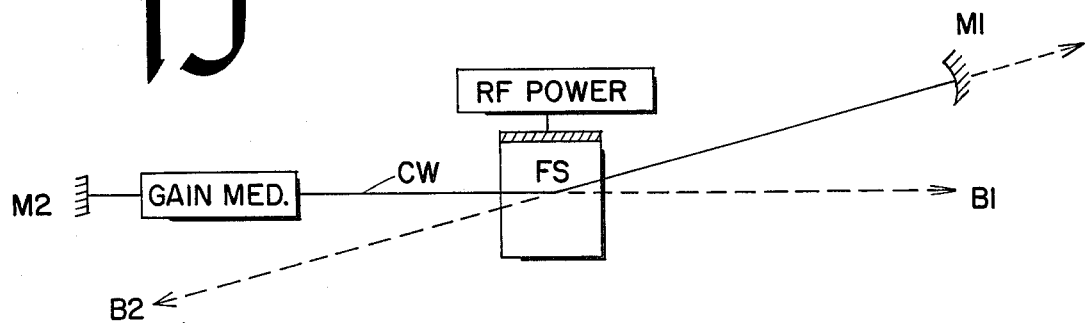
FIG. 3 is a diagram similar to FIG. 2 but further simplified to include a flat mirror together with a curved one which are positioned to produce a linear interference pattern as the signal passes through the acousto-optic modulator and is reflected back upon itself.

Finally, in FIG. 3, a still further simplified unit has been shown in which the lased light beam cw issuing from the laser gain medium L does not circulate as in the modifications of FIGS. 1 and 2, but instead, is reflected back upon itself by concave mirror M1 thus resulting in what could be characterized as a "linear unit". Even so, each time the beam of light passes through the modulator, its frequency is changed the same way it is in the other versions.

The most significant aspect of the invention is, of course, that there is a pulsed output resulting from a frequency shift each pass in an active or passive cavity of a constant wave input. The laser gain medium can be a He-Ne laser as in FIG. 1, a dye laser, a YAG laser or other types. The RF power supply is also, of course, not pulsed.

What is claimed is:

1. The method for generating short optical pulses which comprises: coupling a single constant beam of light of known frequency into a cavity, passing the beam entering said cavity through a means for changing frequency to change its frequency by a predetermined increment, reflecting the frequency-shifted beam leaving the frequency shifting means off, one or more mirrors so angled and so spaced relative to the frequency shifting means such that the beam reflected therefrom circulates within the cavity and repeatedly reenters said frequency shifting means thereby undergoing a further incremental frequency shift during each pass therethrough in phased relation to the beam entering said cavity and to each of the previous frequency-shifted modifications thereof, the recirculated frequency-shifted beams combining with one another and with said beam entering the cavity within said frequency means to output a series of short pulses.

2. The improved method for generating short optical pulses as set forth in claim 1 in which: the pulses are generated within a passive cavity.

3. The improved method for generating short optical pulses as set forth in claim 1 in which: the constant beam of light is of a single frequency.

4. The improved method for generating short optical pulses as set forth in claim 1 in which: the constant beam of light includes at least two modes of frequency separation.

5. The improved method for generating short light pulses as set forth in claim 4 in which: the pulses are modulated in intensity.

6. Apparatus for generating short optical pulses which comprises: means for generating a single constant beam of optical energy of one or more frequencies, frequency-shifting means positioned and adapted to receive said beam of optical energy and output same at a different frequency or frequencies increased or decreased by a known increment, one or more mirrors angled and positioned with respect to the frequency-shifting means such that it or they will receive the beam outputted therefrom and redirect same back into it again as a frequency-shifted input changed incrementally in frequency or frequencies by said known increment during each pass, said mirror or mirrors also being spaced relative to one another and to the frequency-shifting means such that they define a cavity of a length substantially matched to the incremental shift in frequency brought about in said frequency-shifting means so that each frequency-shifted beam arrives and is outputted in phased relation to those before it, each frequency-shifted beam thus combining with other such frequency-shifted beams and with said beam entering the cavity to produce a series of discreet pulses.

7. The apparatus as set forth in claim 6 in which: the frequency-shifting means comprises an acousto-optic modulator.

8. In a frequency-shifted feedback cavity for generating optical pulses from a single constant beam of light of one or more frequencies, said cavity including means for incrementally shifting the frequency or frequencies of an incoming beam and one or more mirrors arranged to receive the frequency-shifted beam outputted from the frequency-shifting means and for reflecting it within the cavity so as to reenter said frequency-shifting means, and where the latter shifts the frequency or frequencies of each incoming wave by a predetermined value $\Omega$, the improvement which comprises: determining the cavity length (L in meters) in accordance with the formula:

$$L = 2n\pi c/\Omega$$

where n is an integer and c is the speed of light expressed in meters/second and spacing the mirror or mirrors relative to the frequency-shifting means such that they define a cavity having a length substantially equal to L thereby matching said cavity length to the incremental frequency increase $\Omega$ and producing a series of discreet pulses.

* * * * *